US007528702B2

(12) United States Patent
Fagrenius et al.

(10) Patent No.: US 7,528,702 B2
(45) Date of Patent: May 5, 2009

(54) DAMAGE-RESISTANT VIBRATOR ASSEMBLIES AND WIRELESS COMMUNICATIONS DEVICES INCORPORATING SAME

(75) Inventors: Gustav Fagrenius, Dalby (SE); Göran Schack, Åhus (SE)

(73) Assignee: Sony Ericsson Mobile Communications AB (SE)

( * ) Notice: Subject to any disclaimer, the term of this patent is extended or adjusted under 35 U.S.C. 154(b) by 602 days.

(21) Appl. No.: 11/413,287

(22) Filed: Apr. 28, 2006

(65) Prior Publication Data

US 2007/0252679 A1 Nov. 1, 2007

(51) Int. Cl.
*H04B 3/36* (2006.01)

(52) U.S. Cl. .............. 340/407.1; 340/388.1; 340/390.1; 310/81; 366/128

(58) Field of Classification Search ............... 340/407.1
See application file for complete search history.

(56) References Cited

U.S. PATENT DOCUMENTS

| | | | | |
|---|---|---|---|---|
| 6,133,657 | A * | 10/2000 | Semenik et al. | 310/81 |
| 6,600,937 | B1 | 7/2003 | Hörngren | |
| 7,129,607 | B2 * | 10/2006 | Segawa | 310/81 |
| 2002/0047368 | A1 | 4/2002 | Shibuta | |
| 2002/0096950 | A1 * | 7/2002 | Kajiwara et al. | 310/81 |

FOREIGN PATENT DOCUMENTS

| | | | |
|---|---|---|---|
| DE | 94 21 468 | U1 | 11/1995 |
| DE | 296 12 257 | U1 | 11/1997 |
| DE | 101 62 555 | A1 | 6/2003 |
| EP | 0 955 762 | A1 | 11/1999 |
| GB | 2 290 364 | A | 12/1995 |

OTHER PUBLICATIONS

International Search Report and Written Opinion of the International Searching Authority, corresponding to International Application No. PCT/US2006/067751, mailed Jan. 26, 2007.

* cited by examiner

*Primary Examiner*—George A Bugg
*Assistant Examiner*—Samuel J Walk
(74) *Attorney, Agent, or Firm*—Myers Bigel Sibley & Sajovec, P.A.

(57) ABSTRACT

A vibrator assembly includes an electric motor, a shaft driven by the motor, and a cylindrical weight coaxially positioned on the shaft free end, wherein the cylindrical weight has a center of gravity that is radially offset from the shaft axis. The cylindrical weight includes a first portion that is lighter in weight than a second portion. When the vibrator assembly is installed within an electronic device, the cylindrical shape of the weight limits the amount of shaft deflection that can occur when the electronic device is dropped or subjected to other impact forces.

4 Claims, 2 Drawing Sheets

DAMAGE-RESISTANT VIBRATOR ASSEMBLIES AND WIRELESS COMMUNICATIONS DEVICES INCORPORATING SAME

FIELD OF THE INVENTION

The present invention relates generally to vibrator assemblies, and more particularly to vibrator assemblies used within electronic devices.

BACKGROUND OF THE INVENTION

Many electronic devices such as radiotelephones and pagers include indicators to alert a user that something has happened or that some action is required. For example, an audible ringer can be used to indicate that a telephone call is being received or that a page has been received. Alternately, a vibrating assembly that causes an electronic device to vibrate can be used to provide silent indication. Such vibrating assemblies typically include a small electric motor, referred to as a vibrator motor, that drives a rotating shaft having an unbalanced or "eccentric" weight (i.e., a weight with a center of gravity that is radially displaced from the axis of rotation), thereby causing a vibration when the shaft rotates.

Unfortunately, conventional vibrator assemblies can be damaged when electronic devices containing them are dropped. Depending on the orientation of the vibrator assembly eccentric weight at the moment of impact, the rotating vibrator shaft may deflect enough to cause damage thereto (i.e., become bent or otherwise damaged). A bent or otherwise damaged rotating shaft can negatively effect the performance of a vibrator assembly. If the weight is in a favorable position, it will hit the surrounding structure of the electronic device, and the shaft will likely not be bent or otherwise damaged. However, since the weight is normally formed as a half cylinder with the shaft in the center of the cylinder, there is a high probability that the shaft may be bent in one direction. Accordingly, there is a need for improved vibrator assemblies that avoid damage to a rotating shaft when dropped and subjected to various impact forces.

SUMMARY OF THE INVENTION

In view of the above discussion, vibrator assemblies that are configured to resist damage thereto when dropped or subjected to other impact forces are provided. According to some embodiments of the present invention, a damage-resistant vibrator assembly includes an electric motor, a shaft driven by the motor, and a cylindrical weight coaxially positioned on the shaft free end, wherein the cylindrical weight has a center of gravity that is radially offset from the shaft axis. According to some embodiments of the present invention, the cylindrical weight includes first and second portions that are radially offset from one another relative to the axis, and wherein the first portion is lighter in weight than the second portion. For example, the first portion is formed from material (e.g., plastic) having a first density and the second portion is formed from material (e.g., metal) having a second density that is greater than the first density. According to some embodiments of the present invention, the first portion of the cylindrical weight may be hollow. When the vibrator assembly is installed within an electronic device, the cylindrical shape of the weight limits the amount of shaft deflection that can occur when the electronic device is dropped or subjected to other impact forces. This is because deflection of the shaft causes the cylindrical weight to contact other internal components and/or the housing of the electronic device.

According to some embodiments of the present invention, a damage-resistant vibrator assembly includes an electric motor, a shaft driven by the motor, and an eccentric weight fixed to a side of the shaft such that a center of gravity of the weight is radially offset from the shaft axis. A distal end of the eccentric weight includes an annular protection ring that is coaxially positioned relative to the shaft axis and that gives the eccentric weight a cylindrical configuration at the distal end thereof. When the vibrator assembly is installed within an electronic device, the cylindrical shape of the eccentric weight distal end limits the amount of shaft deflection that can occur when the electronic device is dropped or subjected to other impact forces. This is because deflection of the shaft causes the distal end of the eccentric weight to contact other internal components and/or the housing of the electronic device.

DETAILED DESCRIPTION OF THE INVENTION

Figure 1:
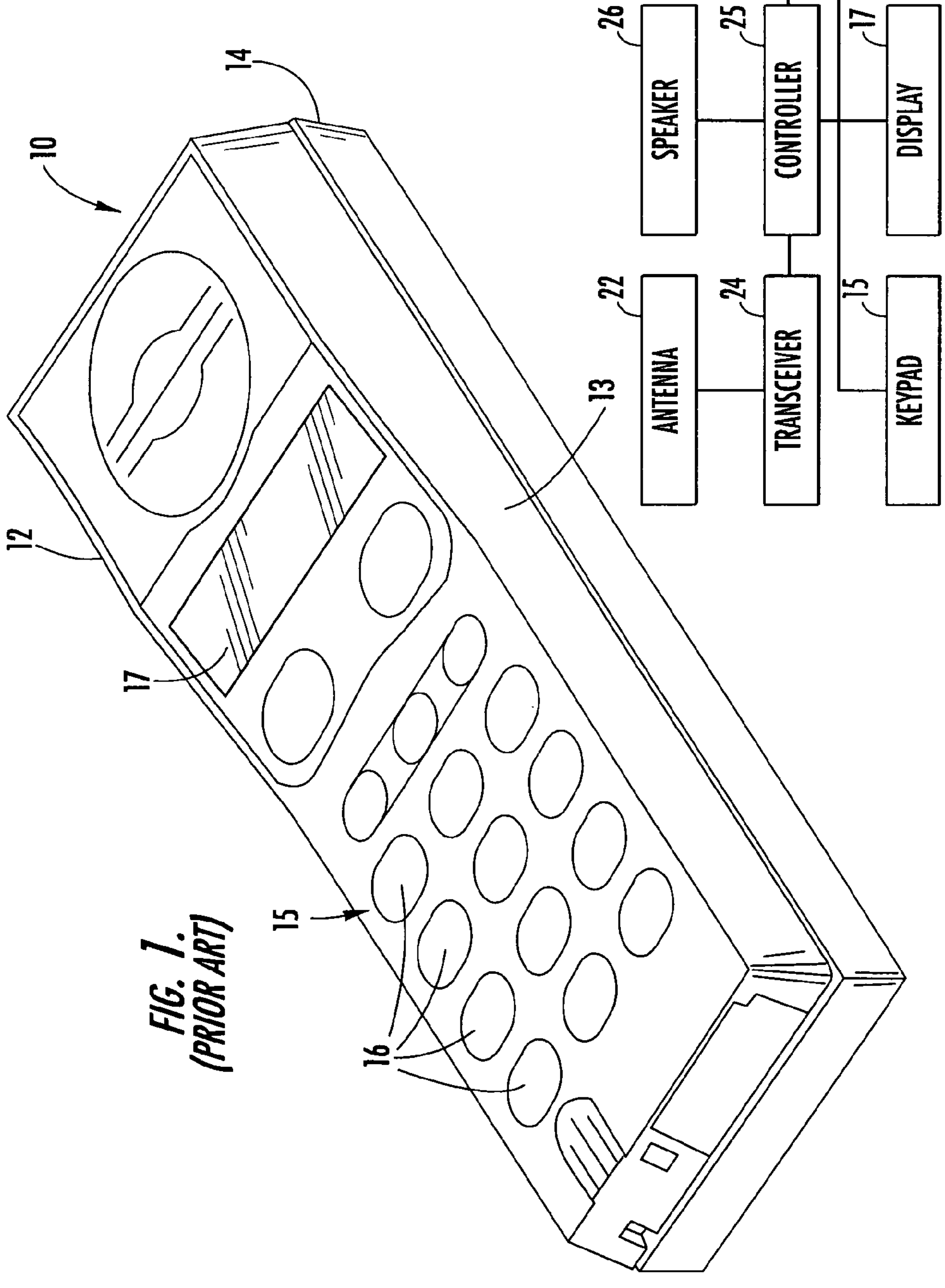
FIG. 1. (PRIOR ART)
FIG. 1 is a perspective view of a conventional wireless communications device.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Referring to FIG. 1, a conventional wireless communications device will now be discussed in further detail. As used herein, the term "wireless communications device" may include, but is not limited to, a cellular wireless terminal with or without a multi-line display; a Personal Communications System (PCS) terminal that may combine a cellular wireless terminal with data processing, facsimile and data communications capabilities; a PDA that can include a wireless terminal, pager, Internet/intranet access, Web browser, organizer,. calendar and/or a global positioning system (GPS) receiver; and a conventional laptop and/or palmtop receiver or other appliance that includes a wireless terminal transceiver. Wireless communications devices may also be referred to as "pervasive computing" devices and may be mobile terminals.

Damage-resistant vibrator assemblies, according to embodiments of the present invention, may be incorporated into a wireless communications device, for example, the wireless communications device 10 illustrated in FIG. 1. As illustrated, the wireless communications device 10 includes a housing 12. The housing 12 includes a top portion 13 and a bottom portion 14 connected to the top portion 13, thus forming a cavity therein. The top and bottom housing portions 13, 14 house a keypad 15, which may include a plurality of keys 16, a display 17, and electronic components (not shown) that enable the wireless communications device 10 to transmit and/or receive communications signals.

Figure 2:
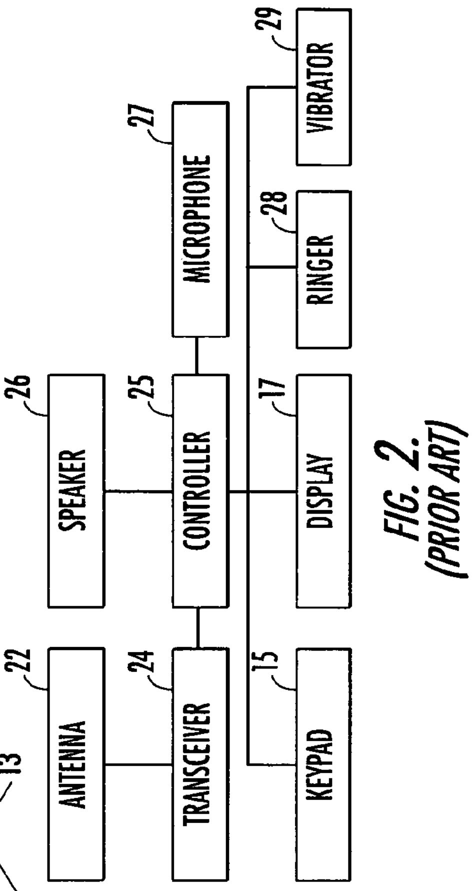
FIG. 2. (PRIOR ART)
FIG. 2 is a schematic block diagram of a conventional arrangement of electronic components within the wireless communications device of FIG. 1.

Referring now to FIG. 2, a conventional arrangement of electronic components that enable a wireless communications device, such as illustrated in FIG. 1, to transmit and/or receive wireless terminal communication signals will be described in further detail. As illustrated, an antenna 22 for receiving and/or transmitting wireless communication signals is electrically connected to a radio-frequency (RF) transceiver 24 that is further electrically connected to a controller 25, such as a microprocessor. The controller 25 is electrically connected to a speaker 26 that is configured to transmit a signal from the controller 25 to a user of a wireless communications device. The controller 25 is also electrically connected to a microphone 27 that receives a voice signal from a user and transmits the voice signal through the controller 25 and transceiver 24 to a remote device. The controller 25 is electrically connected to the keypad 15 and the display 17 that facilitate wireless communications device operation. Also, the controller 25 is electrically connected to an audio ringer 28 and vibrator 29, which are used to indicate that a call or some other message is being received.

Figure 3:
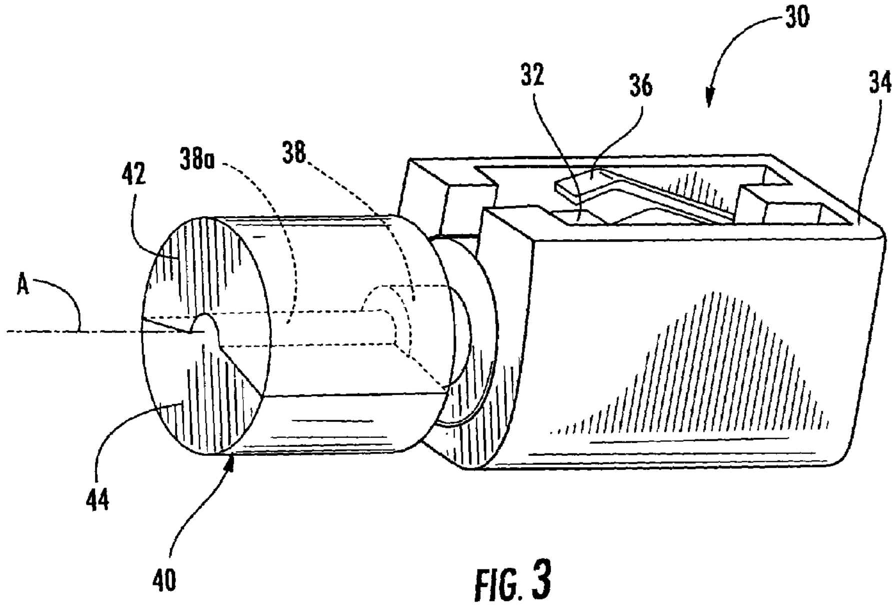
FIG. 3 is a perspective view of a vibrator assembly for a wireless communications device, according to some embodiments of the present invention.

Referring now to FIG. 3, a damage-resistant vibrator assembly 30 according to some embodiments of the present invention is illustrated. It will be understood that the vibrator assembly 30 may be configured for use with various electronic devices, such as wireless communications devices as discussed above. The illustrated vibrator assembly 30 includes an electric motor 32 disposed within a housing 34. One or more electrical contacts 36 are configured to provide electrical power to the electric motor 32 when the vibrator assembly 30 is installed within an electronic device (e.g., mounted on a printed circuit board, etc.), as would be understood by one skilled in the art. The illustrated vibrator assembly 30 includes a shaft 38 that is driven by the motor 32 and that has a free end 38*a* extending outwardly from the housing 34. The shaft 38 is configured to rotate about an axis A, as would be understood by one skilled in the art. A cylindrical weight 40 is coaxially positioned on the shaft free end 38*a*.

The illustrated cylindrical weight 40 includes first and second portions 42,44 that are radially offset from each other and that are formed from materials having different densities. For example, the first portion 42 comprises material having a first density (e.g., polymeric material such as polycarbonate, etc.) and the second portion 44 comprises material (e.g., metal such as magnesium, etc.) having a second density that is greater than the first density. As such, the center of gravity of the cylindrical weight 40 is radially offset from the axis A (i.e., the center of gravity is located in the second portion 44).

The first portion 42 may be formed from virtually any type of material that is lighter in weight (i.e., less dense) than the material of the second portion 44. According to some embodiments of the present invention, the first portion 42 may be hollow. According to some embodiments of the present invention, the first and second portions 42,44 may be formed from similar materials, but the first portion 42 is hollow while the second portion is solid. The hollow configuration of the first portion 42 causes the first portion to be lighter in weight than the second portion 44, thereby causing the center of gravity to be located in the second portion 44. As long as the center of gravity is located in the second portion 44 (i.e., the center of gravity is radially separate from the axis of rotation A), the vibrator assembly will vibrate when the shaft 38 is rotated, as would be understood by one skilled in the art of the present invention.

The first and second portions 42,44 may be joined together in any of various ways including, but not limited to, adhesively joined, mechanically joined, etc. As would be understood by one skilled in the art, mechanically joining the first and second portions 42,44 together includes, but is not limited to, the use of clips, threaded fasteners, keys, pins, etc.

The illustrated first and second portions 42,44 are substantially half-cylindrical portions. However, the first and second portions 42,44 may have different configurations. For example, the first portion 42 may be three-quarters of a cylindrical portion and the second portion 44 may be a one-quarter cylindrical portion, etc. As used herein, the term "half-cylinder" and "half-cylindrical" are intended to include shapes that are more than and less than a half-cylinder.

The shape of the cylindrical weight 40 protects the shaft 38 from damage when an electronic device incorporating the vibrator assembly 30 is dropped or subjected to impact forces. The weight first portion 42 provides sufficient strength to withstand impact forces etc., that may otherwise cause the shaft 38 to bend or become damaged as a result of the off-centered mass of the weight second portion 44. In other words, the cylindrical configuration of the weight 40 provides resistance to bending forces on the shaft 38 because the cylindrical configuration causes the weight 40 to be able to contact other internal components and/or the housing of an electronic device and thereby prevent the shaft 38 from deflecting enough to cause damage thereto.

Figure 4:
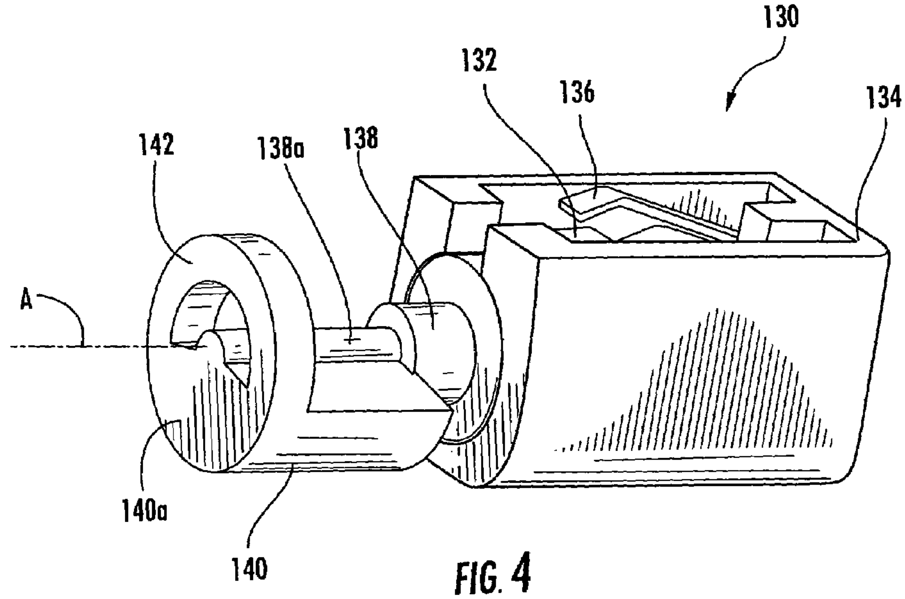
FIG. 4 is a perspective view of a vibrator assembly for a wireless communications device, according to some embodiments of the present invention.

Referring now to FIG. 4, a vibrator assembly 130 according to other embodiments of the present invention is illustrated. It will be understood that the vibrator assembly 130 may be configured for use with various electronic devices, such as wireless communications devices as discussed above. The illustrated vibrator assembly 130 includes an electric motor 132 disposed within a housing 134. One or more electrical contacts 136 are configured to provide electrical power to the electric motor 132 when the vibrator assembly 130 is installed within an electronic device (e.g., mounted on a printed circuit board, etc.), as would be understood by one skilled in the art. The illustrated vibrator assembly 130 includes a shaft 138 that is driven by the motor 132 and that has a free end 138*a* extending outwardly from the housing 134. The shaft 138 is configured to rotate about an axis A, as would be understood by one skilled in the art.

An eccentric weight 140 is fixed to a first side of the shaft 138, as illustrated. The illustrated eccentric weight 140 has a substantially half-cylinder configuration. However, eccentric weight 140 may have various configurations (i.e., may have a configuration that is more than a half cylinder or may have a configuration that is less than a half cylinder).

The illustrated eccentric weight 140 includes a distal end 140*a* that includes an annular protection ring 142 coaxially positioned relative to the shaft axis A, as illustrated. The annular protection ring 142 serves to protect the shaft 138 from damage when an electronic device incorporating the vibrator assembly 130 is dropped or subjected to impact forces. The annular protection ring 142 is configured to provide sufficient strength to withstand impact forces etc., that may otherwise cause the shaft 138 to bend or become damaged as a result of the off-centered mass 140. In other words, the eccentric weight 140 has a cylindrical configuration at its distal end 140*a* as a result of the annular protection ring 142, and this cylindrical configuration provides resistance to bending forces on the shaft 38 because the cylindrical configuration causes the eccentric weight 140 to be able to contact other internal components and/or the housing of an electronic device and thereby prevent the shaft 138 from deflecting enough to cause damage thereto.

The annular protection ring 142 does not contain as much mass as the eccentric weight 140. As such, the center of gravity of the weight 140 is radially offset from the axis A, thus the vibrator assembly will vibrate when the shaft 138 is rotated, as would be understood by one skilled in the art of the present invention.

According to some embodiments of the present invention, the eccentric weight 140 and the annular protection ring 142 are formed from the same material and/or materials having the same density. According to other embodiments of the present invention, the eccentric weight 140 and the annular protection ring 142 are formed from different materials and/or materials having different densities. For example, the annular protection ring 142 may be formed from material having a first density and the eccentric weight 140 may be formed from material having a second density that is greater than the first density.

Damage-resistant vibrator assemblies, according to embodiments of the present invention, may have various shapes, configurations, and/or sizes. Embodiments of the present invention are not limited to the illustrated configurations of the vibrator assemblies 30,130 in FIGS. 3 and 4.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A wireless communications device, comprising:

a housing configured to enclose a receiver that receives wireless communications signals and/or a transmitter that transmits wireless communications signals; and a vibrator assembly disposed within the housing, comprising:

an electric motor;

a shaft driven by the motor, wherein the shaft has a free end, and wherein the shaft rotates about an axis; and an eccentric weight fixed to a first side of the shaft such that a center of gravity of the weight is offset from the axis in a radial direction, wherein the eccentric weight has a distal end that comprises an annular protection ring coaxially positioned relative to the shaft axis.

2. The wireless communications device of claim 1, wherein the eccentric weight has a half-cylinder configuration.

3. The wireless communications device of claim 1, wherein the eccentric weight and annular protection ring comprise material having the same density.

4. The wireless communications device of claim 1, wherein the annular protection ring comprises material having a first density and wherein the eccentric weight comprises material having a second density that is greater than the first density.

* * * * *